E. L. Staples,
Hand Planter.
No. 111,883. Patented Feb. 14, 1871.
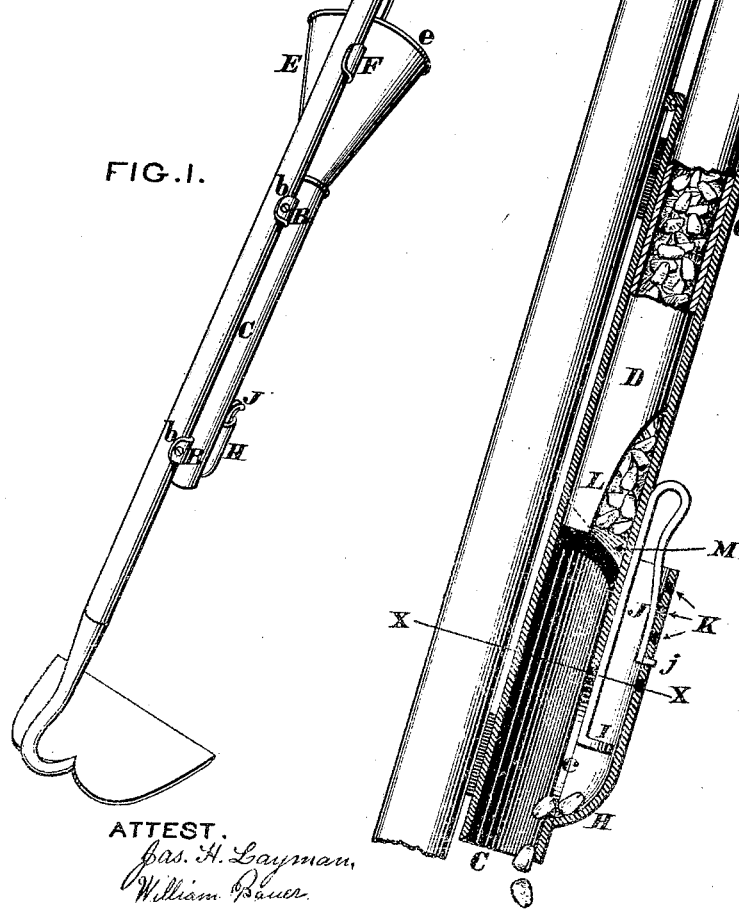

UNITED STATES PATENT OFFICE.

EDMUND L. STAPLES, OF CHILLICOTHE, OHIO.

Letters Patent No. 111,883, dated February 14, 1871.

IMPROVEMENT IN CORN-DROPPING ATTACHMENTS FOR HOES.

The Schedule referred to in these Letters Patent and making part of the same.

I, EDMUND L. STAPLES, of Chillicothe, Ross county, Ohio, have invented a new and useful Corn-Dropping Attachment for Hoes, of which the following is a specification.

Nature and Objects of the Invention.

My invention relates to the class of corn-planting devices designed to be attached to the handle of a common hoe, and which enable one person to both drop and cover at one operation; and My invention consists in an arrangement of parts for the more effectual and easy operation of such an instrument.

General Description with Reference to the Drawing.

Figure 1 represents, by perspective view, a hoe furnished with my attachment.

Figure 2 is a partly sectional side elevation of such an attachment.

Figure 3 is a transverse section at the line X X.

Figure 4, a perspective view of the lower end of the grain-holder.

Attached to the under side of a common hoe-handle, A, by means of ears B and wood screws b, is a tubular guide or conductor, C, open at both ends, and adapted to receive my tubular grain-holder, D, which holder is capable of sliding up and down in the guide C, and is surmounted by a hopper, E, having a hinged cover, e, to prevent the escape of grains, ears, F, to guide the upper end of the holder along the handle of the hoe, and a hook or handle, G, by which the holder is drawn up, as shown in fig. 2, when it is desired to deposit a hill of grain.

The guide-tube C has, near its lower end, an orifice, c, communicating with a pocket, H, having a sliding gauge, I, whose spring-catch J, having a projection, j, one or other of a series of holes, K, holds the gauge to a more or less elevated position, and thus determines the capacity of the pocket, and, consequently, the quantity of grain delivered at each stroke of the holder.

The lower end of the holder D has an opening, L, guarded by a brush or cut-off, M, which opening permits two, three, or more grains to escape into the pocket H at each descent of the holder, the number of grains being regulated by the adjustment of the gauge I up or down in the pocket.

The hopper-termination of the holder gives it capacity enough for an amount of grain sufficient to cross any ordinary field, and the movement up and down of the holder, when in use, acts to so loosen and agitate the grain as to preserve it from bunching.

The tube or guide being prolonged below the pocket, the brush, in ascending, spreads the grains out against the concavity of the guide and prevents bunching.

When it is desired to use the hoe for other purposes than planting grain, the holder, with whatever grain it may contain, is easily separated, and may be laid aside for future use without spilling the corn.

The spring-catch J, being securely held by one or other of the holes K in the pocket, prevents the possibility of any accidental disturbance of the adjustment.

I am aware that a patent was granted on the 10th day of September, 1867, to C. W. Cotton and myself for a corn-dropper, which comprised a sliding receptacle, a seed-pocket, a brush, and and an adjustable gauge.

I therefore disclaim novelty in such devices apart from the specific construction and arrangement hereinbefore indicated, the distinguishing features of the present improvement being the hopper-like enlargement of the seed-holder, and the series of holes K, securing a positive adjustment of the gauge.

Claim.

I claim as new and of my invention—

As an improvement on the patent of Cotton and Staples, No. 68,607, the holes K in the seed-pocket H, and the projection j on the spring J, as and for the purpose set forth.

In testimony of which invention I hereunto set my hand.

E. L. STAPLES.

Witnesses:
GEO. H. KNIGHT,
JAMES H. LAYMAN.